(12) United States Patent
Moore et al.

(10) Patent No.: US 11,761,883 B2
(45) Date of Patent: *Sep. 19, 2023

(54) INTEGRATING CAVITY OF MONOLITHIC FUMED SILICA

(71) Applicants: Thomas Moore, San Antonio, TX (US); Kurt D. Retherford, San Antonio, TX (US); Charity Phillips-Lander, San Antonio, TX (US)

(72) Inventors: Thomas Moore, San Antonio, TX (US); Kurt D. Retherford, San Antonio, TX (US); Charity Phillips-Lander, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 74 days.

This patent is subject to a terminal disclaimer.

(21) Appl. No.: 17/245,932

(22) Filed: Apr. 30, 2021

(65) Prior Publication Data
US 2022/0349812 A1    Nov. 3, 2022

(51) Int. Cl.
*G01N 21/05*    (2006.01)

(52) U.S. Cl.
CPC ....... *G01N 21/05* (2013.01); *G01N 2021/052* (2013.01)

(58) Field of Classification Search
CPC .................. G01N 21/05; G01N 2021/052
See application file for complete search history.

(56) References Cited

U.S. PATENT DOCUMENTS

| | | | |
|---|---|---|---|
| 4,912,072 A | 3/1990 | Mallouk | |
| 7,868,287 B2 | 1/2011 | Fry | |
| 9,927,417 B2 * | 3/2018 | Yakovlev | G01N 21/39 |
| 11,346,771 B1 * | 5/2022 | Moore | G01N 21/31 |

* cited by examiner

*Primary Examiner* — Rebecca C Bryant
(74) *Attorney, Agent, or Firm* — Verrill Dana, LLP

(57) ABSTRACT

A fumed silica monolithic integrating cavity device. The device is configured to facilitate optical measurements taken from a sample positioned within a cavity of the device. The cavity is defined by a fumed silica monolith with the added feature of a fused quartz lining on the surface of the monolith. This provides an intermediate surface that allows for cleaning and reuse of the highly effective diffuse light scattering fumed silica monolith. Furthermore, the lining may be placed under pressure or vacuum to structurally enhance mechanical integrity of the underlying monolith. Thus, continued or reliably repeated use of the device may be appreciated as well as use in more industrial environments that are prone to vibration.

20 Claims, 5 Drawing Sheets

INTEGRATING CAVITY OF MONOLITHIC FUMED SILICA

BACKGROUND

Materials and items used in a variety of different applications are often evaluated for different character traits prior to use. Samples of different material types may be subjected to tests and evaluations to determine chemical properties, robustness, reflectiveness or any number of different optical and other behaviors. By way of a more specific example, a reflective coating or a light emitting diode (LED) light may be tested to determine optical characteristics prior to use, for example as a matter of quality control and rating. Of course, this and alternative sample types may be evaluated for absorption, scattering or a host of other optical characteristics as well.

When it comes to attaining optical measurements for a sample item, an integrating cavity is often utilized. An integrating cavity, sometimes referred to as an integrating sphere, is an optical apparatus that is defined by a diffuse reflecting material that is used to reflect light in all directions. That is, in contrast to using a mirror to reflect light in a particular direction, an integrating cavity utilizes a cavity of a known volume and dimensions that is defined by diffuse reflecting material configured to reflect light from the sample item in all directions, thereby uniformly distributing light within the cavity volume. Thus, a more accurate optical characteristics of the sample item may be acquired. The advantage with such an apparatus is that the reflected light may only be lost due to absorption or exit through an opening but is otherwise unaffected by scattering within the cavity. Optical radiance, spectral response, such as absorption and/or fluorescence, and optical energy may all be measured with a great deal of accuracy by employing an integrating cavity.

Apart from the architecture and potential for gaps, the degree of accuracy for an integrating cavity is limited by the amount of reflectiveness exhibited by the reflective material. Presently, state of the art integrating cavities may achieve a little over 99% reflectivity, with fairly small losses attributable to absorption. This is due to the availability of diffuse reflective materials such as specially tailored polytetrafluoroethylenes (PTFEs) and other fluoropolymers. For example, Spectralon® may exhibit a reflectivity of greater than about 99% in the visible range of between about 400 nm and about 700 nm, but with greater degrees of absorption outside of this range. These types of reflective materials may be considered Lambertian materials in that they exhibit an ideal matte or diffusely reflective behavior. A Lambertian material is one that may display a surface with isotropic luminance that approaches Lambert's cosine law of perfect diffusion (named after Johann Heinrich Lamber, who introduced the concept).

Of course, as with anything else, efforts to improve on the reflectivity available from current Lambertian materials, persist. To this end, fumed silica powder has been studied and employed as a Lambertian material, even within the context of integrating cavity applications. Fumed silica may be an improvement over other more conventional Lambertian materials in that it is known to display reflectivity of over 99.5% in the visible spectral range and even outside of this range, such as in the UV and near infrared spectral range.

Unfortunately, as a practical matter, utilizing fumed silica as a reflective for integrating cavity applications poses significant challenges. More specifically, the behavior of the fumed silica powder is one that is readily prone to degradation as water or other atmospheric contaminants are absorbed by the material during use. Fumed silica powder exhibit a large surface area and electrostatic properties such that dust, pollen, moisture and other contaminants are attracted to and readily absorbed by the powder. Once more, cleaning the contaminated surface of fumed silica with a conventional solvent or cleanser is not practical given that these cleaners are also prone to uptake by the fumed silica.

In theory, fumed silica may be formed into a block or monolithic body to serve as a reflective. That is, more than simply providing a thin coating for sake of reflectiveness, a substantial thickness of fumed silica powder may be used to serve as the Lambertian material for the integrating cavity. Thus, the reflective ability of the fumed silica may be enhanced. Of course, as with issues of contaminant uptake, the ability to utilize a fumed silica in monolithic form also presents a challenge. Namely, the fumed silica is naturally powder in form and may be structurally resistant to maintaining a durable monolithic form. Indeed, whether for this reason or due to contaminant issues, the ability to repeatedly utilize an integrating cavity that is reliant on fumed silica as a reflective remains largely impractical. At present, in spite of the notable improvement in reflectivity, integrating cavities that utilize fumed silica as the reflective have a useful life of no more than about two months. Therefore, integrating cavities lacking this enhanced degree of reflectivity but offering greater durability are still generally utilized.

SUMMARY

An integrating cavity device is disclosed. The device includes a monolithic fumed silica that is used to define a cavity therein where a sample item may be located to facilitate measurements thereof. The monolithic fumed silica is contained within an outer housing of a primary body and of a tray body. Further, the monolithic fumed silica is outfitted with a substantially transparent lining on the silica of each body that further defines the cavity.

BRIEF DESCRIPTION OF THE DRAWINGS

Implementations of various structure and techniques will hereafter be described with reference to the accompanying drawings. It should be understood, however, that these drawings are illustrative and not meant to limit the scope of claimed embodiments.

DETAILED DESCRIPTION

Embodiments are described with reference to a particular integrating cavity utilizing fumed silica as a diffuse reflective material. Specifically, the embodiments depict a device or unit that includes a primary body defining a cavity with a separately provided tray body to accommodate a sample for optical testing within the cavity. However, other configurations of the device may be utilized. For example, there is no requirement that the primary body define the majority of the cavity or even be larger than the underlying tray. These terms and configurations are illustrative only. It may well be that the tray defines a substantial portion of the cavity or even constitutes the larger body with the primary body, resembling more of a lid. In another embodiment, the bodies may be roughly similar in size and shape with a coupling location between the two being roughly at a midline of the device. Regardless, so long as the cavity defined by the fumed silica for each body is lined with a substantially transparent liner, appreciable benefit may be realized.

Figure 1:
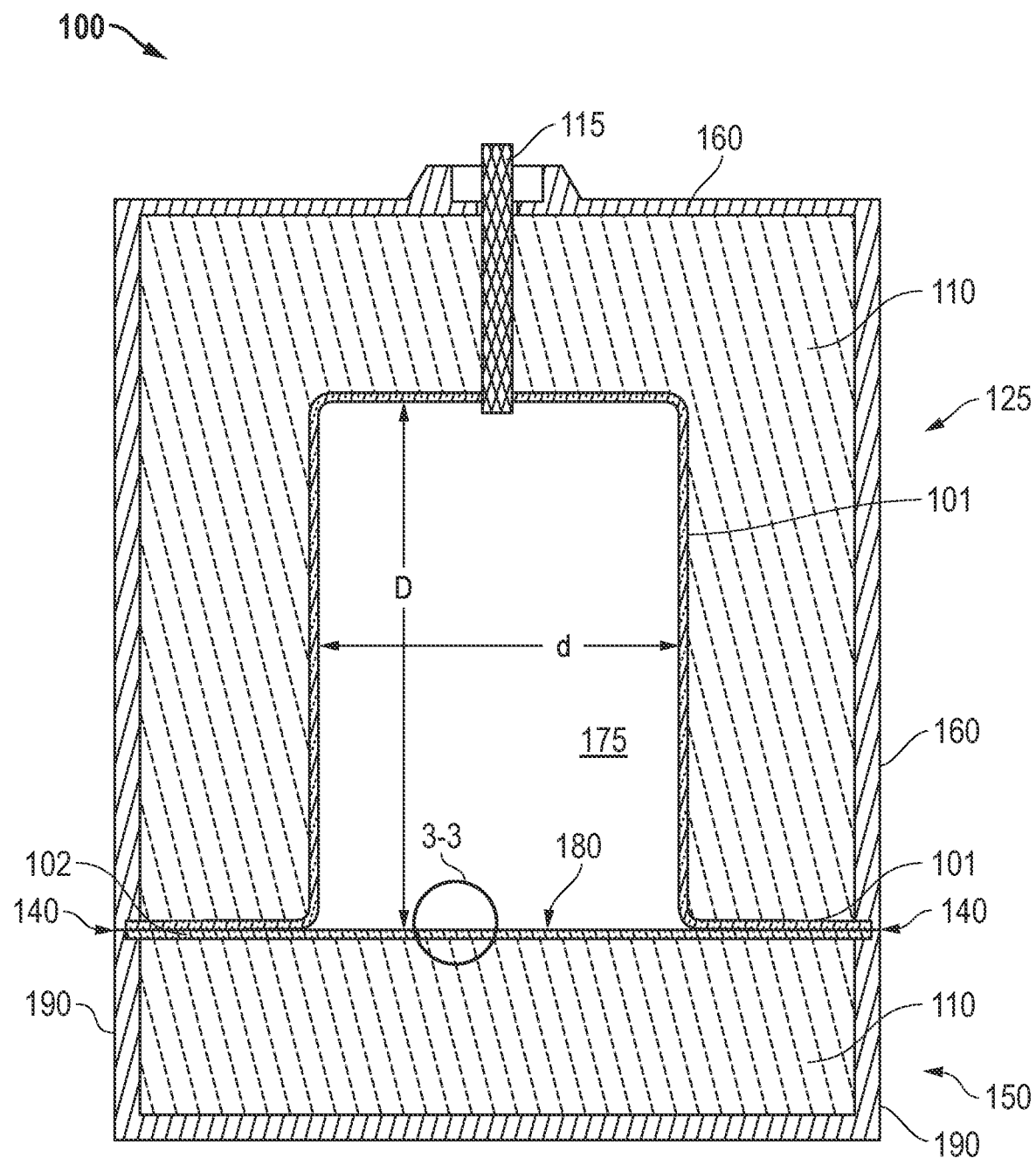
FIG. 1 is a side cross-sectional view of an embodiment of a fumed silica integrating cavity.

Referring now to FIG. 1, a side cross-sectional view of an embodiment of a fumed silica integrating cavity 100 is depicted. As suggested, this device 100 is largely comprised of a fumed silica 110 to serve as a diffuse reflective. However, in other embodiments, magnesium fluoride or barium sulfate may be utilized as the monolith 110 detailed herein. Regardless, a housing is divided into a primary body 125 and a tray body 150, each with an outer housing 160, 190 comprised of a suitable material such as stainless steel or titanium, although other durable materials may be utilized to supply adequate hardware for securing the cavity as described herein. Regardless, these outer housings 160, 190 are filled with the fumed silica 110 in a tightly packed monolithic form. As alluded to above and detailed further below, this type of fumed silica 110 may be highly effective as a diffuse reflective for integrating cavity applications such as optical spectroscopy or routine optical photometry and metrology.

Continuing with reference to FIG. 1, to enhance the long-term reliability and effectiveness of the fumed silica 110 as a diffuse reflective, a substantially transparent liner 101, 102 is provided at the inner surface of the monolithic silica 110 for each of the bodies 125, 150. Among other benefits, the liner 101, 102 provides a clear durable surface that may be cleaned using common solvents and cleansers without long-term effects to the liner 101, 102 or integrating cavity 100 performance. With added reference to FIG. 4, the inner surface of this silica 110 defines the actual cavity 175 of the integrating cavity device 100 where a sample 450 for evaluation may be located, for example, on the tray liner 102 (e.g. at location 180). Thus, the ability of the silica 110 to serve as a diffuse reflective with respect to the cavity 175 and sample 450 therein is dependent on the transparent nature of the liner 101, 102. In one embodiment, the liner 101, 102 is of a fused quartz, which may be referred to as a "fused silica", that is bonded to the outer housing material 160, 190. In one embodiment, the liner 101, 102 is of a clarity that displays negligible effect on light directed from the cavity 175 interior toward the fumed silica 110 or that is diffusely reflected back from the fumed silica 110. Thus, the liner material may be referred to herein as being "substantially transparent". This term is meant to encompass any degree of substantial translucency, such as where the liner 101, 102 is intentionally frosted or tailored with a degree of opaqueness or color additive to attain a degree of light filtering for sake of measurement focus. Indeed, to the extent that a seam is present at the gap 140 between the bodies 125, 150, this may be mitigated by utilizing an opaque liner 120 at the tray body 150.

The noted light of the cavity 175 during an integrating cavity application is provided and diffusely reflected back relative a round, square, rectangular, tapered or hexagonal rod of a light pipe 115. This pipe 115 may be a collimated integrating or homogenizing light pipe constructed of the same fused quartz or other material of the liner 101, 102. The pipe 115 may interface with fiber optics as described below for sake of light delivery and collection relative the cavity 175. The dimensions of the cavity 175 (such as (D) and (d)) are stored such that absorption and other readings acquired from an integrating cavity application as they relate to a given sample 450 may be used to calculate optical characteristics of the sample 450 (e.g. see the system layout 400 of FIG. 4).

The light pipe 115 may enter the upper or primary body 125 via an air-tight seal. Indeed, the interfacing liner 101 may also be air-tight and serve to sealingly define the cavity 175 with respect to the contained fumed silica 110 of the primary body 125. The liner 102 of the tray body 150 may do the same with respect to the retained fumed silica 110 thereat for sake of environmental isolation. Regardless, given the irregular morphology and potentially structurally delicate nature of the packed fumed silica 110, the liner 101,102 may also serve a function of mechanical reinforcement to the underlying monolithic silica 110. In one embodiment, the liner 101, 102 is not only air-tight but also placed under vacuum to even further enhance structural integrity and reflectiveness of the silica 110.

Figure 2A:
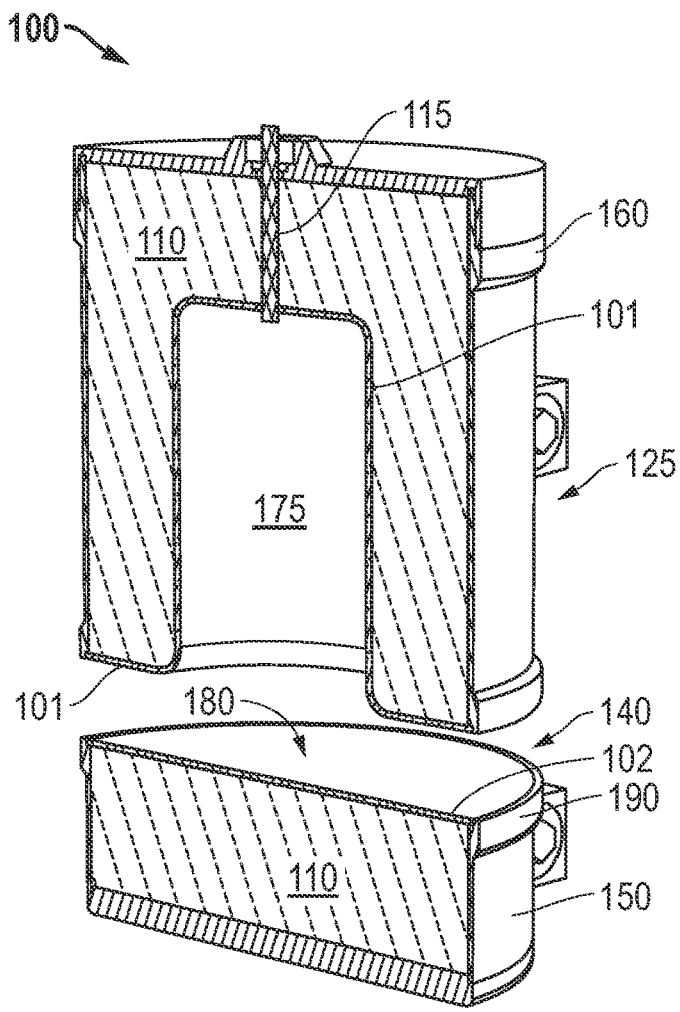
FIG. 2A is an exploded perspective view of the fumed silica integrating cavity of FIG. 1.
Figure 4:
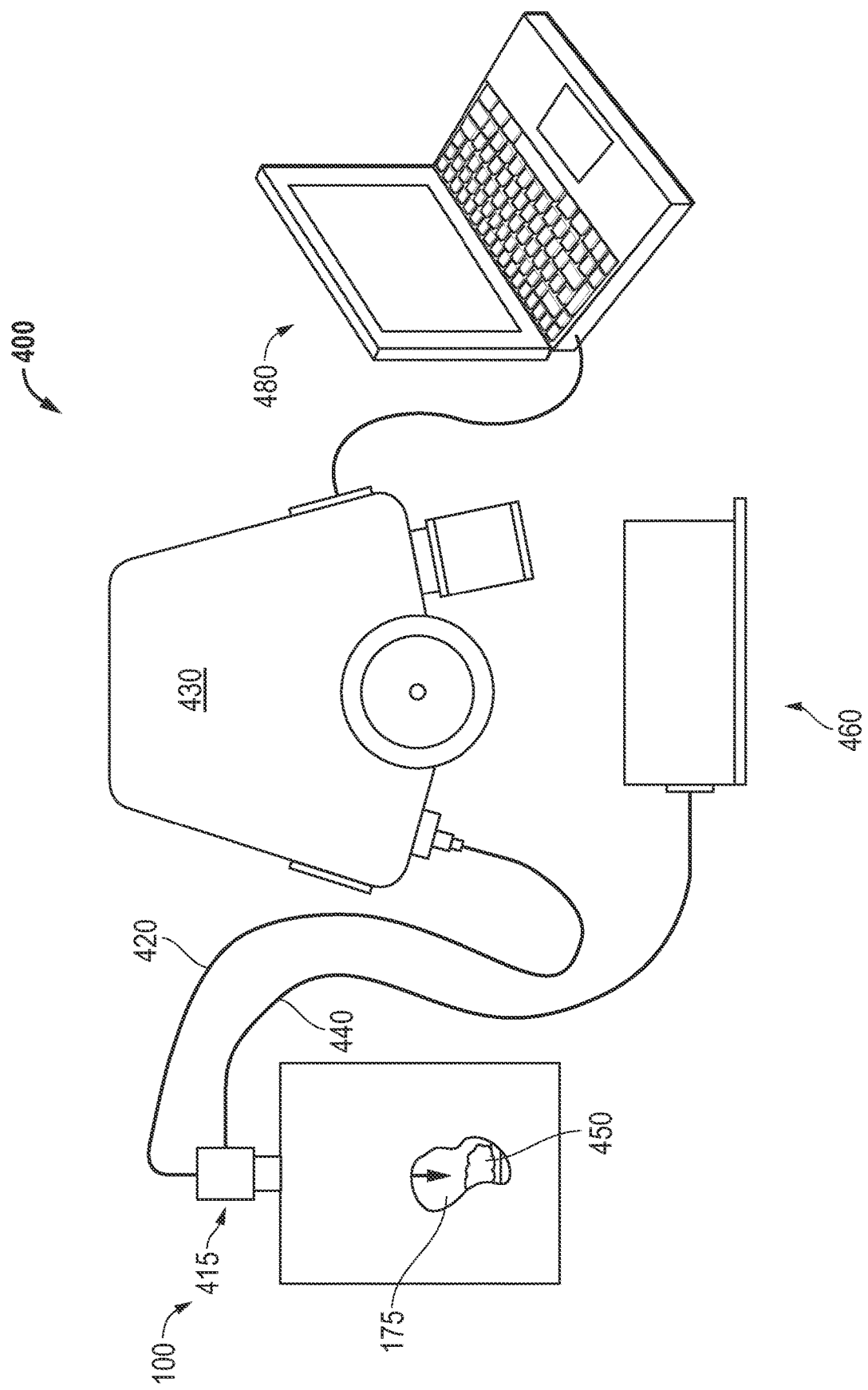
FIG. 4 is a schematic layout of an embodiment of an optical measurement system employing the integrating cavity of FIG. 1.

Referring now to FIG. 2A, an exploded perspective view of the fumed silica integrating cavity 100 of FIG. 1 is illustrated. In this view, the two bodies 125 are shown separated revealing how a sample 450 as shown in FIG. 4 might be placed at the tray body location 180 prior to an integrating cavity application. Each monolith 110 of fumed silica is apparent, housed at each body 125, 150, sandwiched between a given liner 101, 102 and housing material 160, 190. This sandwiching of the monolithic fumed silica 110 may help avoid damage due to impact or vibration that might be found in an industrial environment. Therefore, the integrating cavity 100 may be used in a harsher environment or even shipped, by land, sea, air rocket or whatever the case may be, without undue concern over damage.

The monolithic fumed silica 110 for each body 125, 150 may be fabricated as a monolithic structure of packed 20-50 nm particle size fumed silica. Pressurizing and baking of the fumed silica in conjunction with the pressing or packing, for example, at 800-1,000° C., may be used to eliminate moisture prior to monolithic fabrication by way of an additive process. That is, reductive machining or milling to remove monolithic material may be avoided in forming the cavity. Thus, monolithic material losses of up to 60% for a 10" cavity may be avoided.

For such an embodiment, there would be no internal gaps or seams and each monolith would be environmentally isolated by the indicated sandwiching. Further, as indicated above, the final construct may be under a vacuum seal, for example by a conventional low outgassing adhesive isolating process, ultimately enhancing reflectivity of the monolith 110. Electrostatic forces of the fumed silica particles may act to further hold each monolith 110 together. Ultimately, a diffuse reflective with a reflectivity of over 99.8% in the visible spectral range of 400 nm-700 nm may be attained that is held together in a mechanically resilient and reliable form. Even outside of this range, reflectivity of greater than about 99.5% may extend from about 220 nm to about 1,300 nm for such fumed silica embodiments.

Figure 2B:
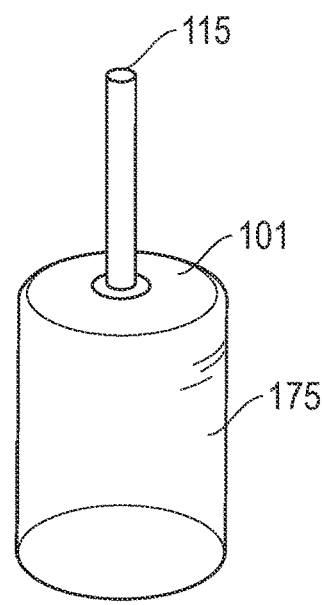
FIG. 2B is a perspective view of a substantially transparent liner for interfacing fumed silica within a primary body of the integrating cavity of FIG. 1.

Referring now to FIG. 2B, a view of one of the substantially transparent liners 101 is shown in perspective isolation. This is the liner 101 for interfacing fumed silica 110 within the primary body 125 of the integrating cavity 100 as shown in FIG. 2A. For the embodiment illustrated, the light pipe 115 described above is shown integral with this upper or primary liner 101 for coupling light into and out of the cavity 175 below. Further, the manner in which the cavity 175 is mostly defined by this liner 101 is readily apparent. Of course, as described above, alternative cavity 175 architecture may be employed.

Figure 3:
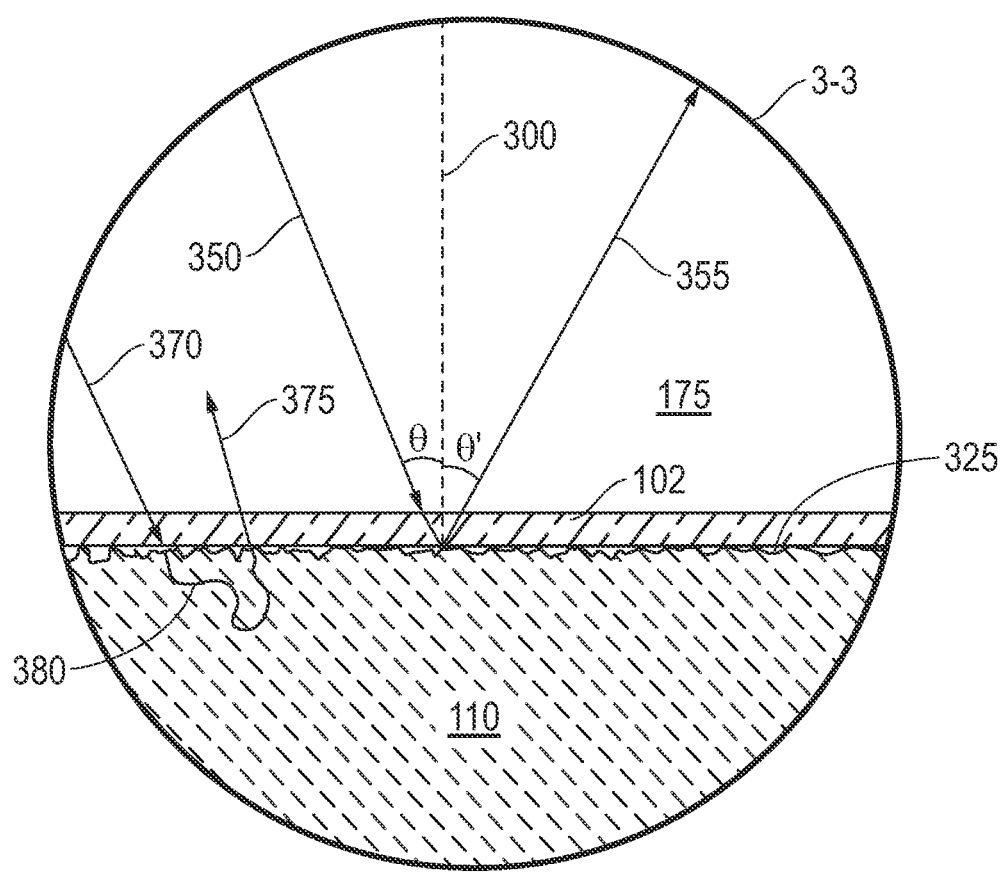
FIG. 3 is an enlarged view taken from 3-3 of FIG. 1 illustrating light behavior during a measurement test run with the integrating cavity.

Referring now to FIG. 3, an enlarged view taken from 3-3 of FIG. 1 is illustrated. More specifically, this view illustrates the behavior of light (e.g. 350, 355, 370, 375) during a measurement test run with the integrating cavity 100 of FIG. 1. Notice the highly irregular surface 325 of the fumed silica 110. The illustration highlights the irregular morphology of fumed silica particles but is not meant to infer that there would be any notable spaces between the compacted monolithic fumed silica 110 and the depicted liner 102. Rather, the illustration highlights the fact that the diffuse reflective of fumed silica 110 may scatter light 350, 370 in every manner of directions. For example, like a conventional non-diffuse reflective, the fumed silica 110 may receive incident light 350 at one angle θ and reflect it 355 at another roughly equivalent angle θ ' (as measured along a perpendicular axis 300 relative the surface 325). This mirroring of the light 350, 355 would be fairly standard for a non-diffuse reflective material. However, the unique nature of the fumed silica 110 is that it is highly diffuse with a substantially irregular surface 325 and morphology throughout. Thus, in other instances, incident light 370 may be received, penetrate the surface 325 by several mm, bounce around in a refracted nature within the material (see 380) and ultimately be reflected 375 at any number of different angles irrespective of the angle of the received incident light 370. That is, while the light 370 may initially seem to be absorbed, it will generally end up reflected 375 but at a random angle having no apparent relation to the angle of the incident light 370.

Continuing with reference to FIG. 3, the refracted bounced around light 380 penetrating the fumed silica 110 is generally ultimately reflected as illustrated. Indeed, the fumed silica 110 may be rated to be over 99.8% reflective as indicated, filling the volume of the cavity 175 with light. Thus, only negligible degree of absorption of the light 370 actually occurs. Further, the randomness with which the light is reflected results in a Lambertian scattering of light displaying a radiance that is the same in all directions which is well suited for integrating cavity applications. For example, a sample 450 placed at the liner 102 may be analyzed in terms of its own differing effect on light and absorption in contrast to the scattered light (see FIG. 4). So, for example, a bulk powder amino acid may be subjected to such an application to ascertain its characteristics, purity or even to confirm that the amino acid is the purported amino acid sample. Any number of other substances may be evaluated in much the same way.

The presence of the transparent liner 102 also means that the integrating cavity 100 may be more durable and receptive to cleaning. Therefore, the integrating cavity 100 is not only effective as an optical measurement device, but it may be repeatedly used over time, with measurements of one sample followed by measurements of another, without undue concern over device durability.

Referring now to FIG. 4, a schematic layout of an embodiment of an optical measurement system 400 is illustrated. Depending on the application to be run, this may be referred to as an iCAS (integrating cavity absorption spectroscopy), iCRD (integrating cavity ring-down spectroscopy), iCEFS (integrating cavity enhanced fluorescence spectroscopy), iCERS (integrating cavity enhanced Raman spectroscopy) or other application system. The system 400 employs the integrating cavity 100 of FIG. 1 in conjunction with a laser assembly 460 and a spectrometer 430 to deliver light and collect light, respectively for analysis. Of course, any spectral detector may be suitably employed. Further, a conventional laptop 480 is shown communicatively coupled to the spectrometer 430 to serve as an interface for analysis of the collected light data from the spectrometer 430. Ultimately, this may provide optical information regarding the sample 450 within the cavity 175 of the integrating cavity device 100.

Continuing with reference to FIG. 1, the laser assembly 460 or other light source may emit light from a diode laser along a laser optical fiber 440 to the integrating cavity 100 via an optical coupling 415 at the light pipe 115 of FIG. 1. In one embodiment, the coupling 415 is a common lens mount thread to support fiber optic connectivity. Regardless, the resultant scattered light as described above may be collected through the collection optical fiber 420 via the same coupling 415 and pipe 115 for routing to the spectrometer 430. Because light uniformly fills the cavity 175, the whole sample surface or volume within the cavity is measured simultaneously providing enhanced sample measurements for analysis. As suggested, the particular application may vary. For example, in one embodiment "ring-down" characteristic time of short light pulses interacting with the sample 450 may be analyzed, Raman or trace fluorescence measurements may be analyzed or any number of readings evaluated. These may also include metrology analyses such as radiance, emission spectral energy or even power measurements.

Figure 5:
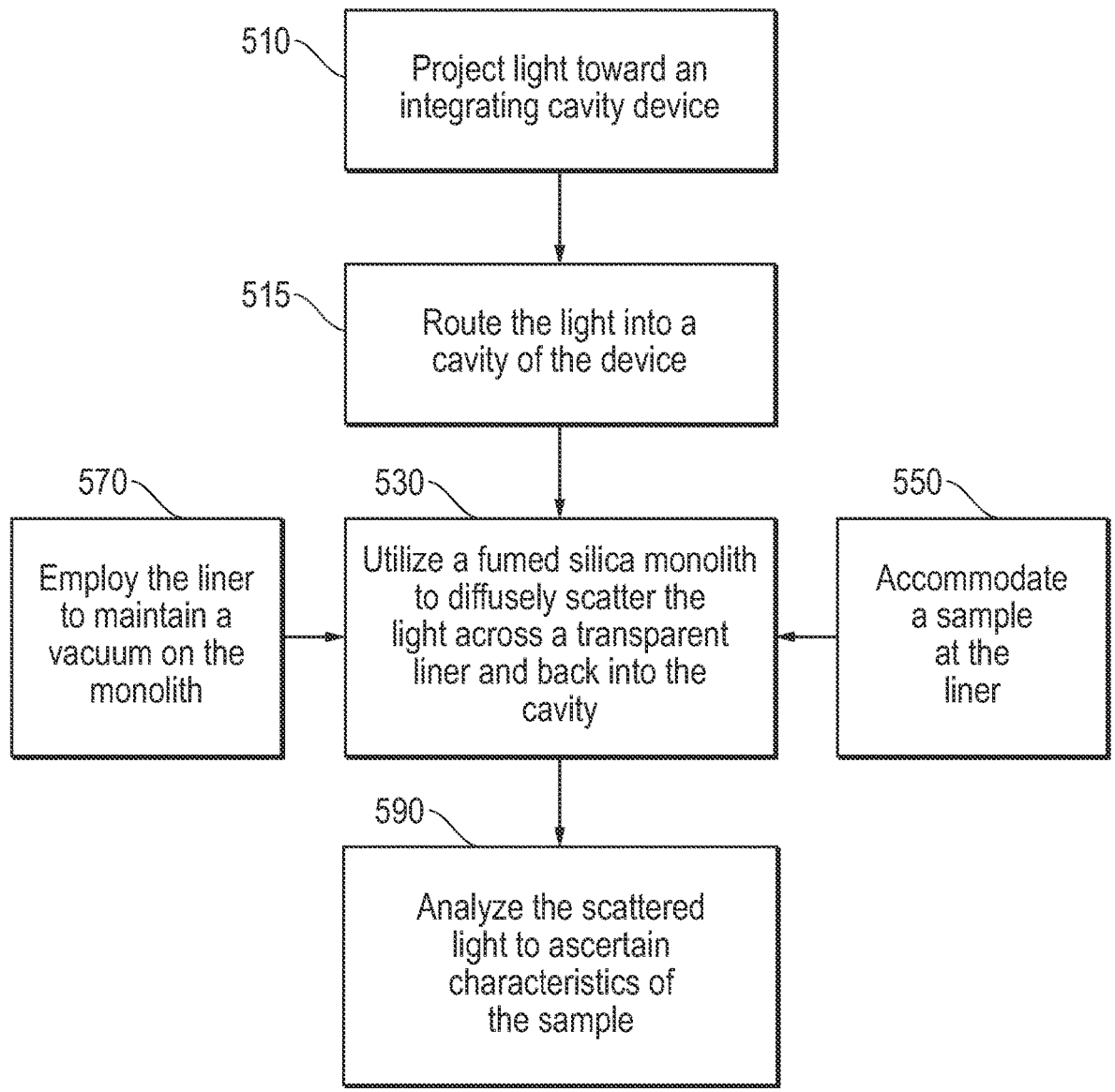
FIG. 5 is a flow-chart summarizing an embodiment of utilizing the system of FIG. 5 to attain optical measurements of a sample within the integrating cavity of FIG. 1.

Referring now to FIG. 5, a flow-chart is shown summarizing an embodiment of utilizing the system of FIG. 5. Specifically, the system is used to attain optical measurements of a sample within an integrating cavity as illustrated in FIG. 1. A light is projected toward the integrating cavity device and routed to a cavity therein as indicated at 510 and 515. A sample is located within the cavity of the device where a fumed silica monolith is used to diffusely scatter the light across a transparent liner that helps define the cavity (see 530, 550). Further, as indicated at 570, the liner may also be employed to maintain a vacuum on the monolith to further ensure its integrity and durability for the application, the application environment and even for transport to the application environment location.

Embodiments described hereinabove include fumed monolithic silica integrating cavities. More specifically, these cavity devices include a protective lining at the surface of the fumed silica that is transparent and protective to the underlying fumed silica. Thus, the devices may be cleaned and utilized repeatedly without undue concern over impurities in the cavity or damage to the fumed silica that might render the devices less effective.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. Furthermore, the foregoing description should not be read as pertaining only to the precise structures described and shown in the accompanying drawings, but rather should be read as consistent with and as support for the following claims, which are to have their fullest and fairest scope.

We claim:

1. An integrating cavity device to facilitate optical measurements of a sample item therein, the device comprising:
   an outer housing to attain light from an external source;
   a diffusely reflective monolithic fumed silica accommodated by the outer housing and including a surface defining a cavity within the device, the cavity to receive the light; and
   a substantially transparent liner of fused quartz on the surface of the fumed silica defining the cavity and in air-tight sealing communication therewith.

2. The integrating cavity device of claim 1 wherein the air-tight sealing communication of the liner to the fumed silica monolith supplies mechanical reinforcement thereto.

3. The integrating cavity device of claim 1 wherein the air-tight sealing communication of the liner to the fumed silica monolith is supplied under vacuum pressure relative the underlying monolith.

4. The integrating cavity device of claim 1 wherein the fumed silica monolith is rated at greater than 99.5% reflective over a spectrum of between about 220 nm and about 1,300 nm and greater than 99.8% between about 400 nm and about 700 nm.

5. The integrating cavity device of claim 1 wherein the outer housing comprises a primary body and a sample tray body, the monolithic fumed silica comprising a first and second monolithic fumed silica bodies with the liners thereon and accommodated by the primary and sample tray bodies respectively, the primary and sample tray bodies joining together to define the cavity between the monolithic fumed silica bodies.

6. The integrating cavity of claim 5 wherein the liner at the surface of the fumed silica monolith for the sample tray body is substantially translucent.

7. The integrating cavity device of claim 6 wherein the liner at the surface of the fumed silica monolith for the sample tray body is one of frosted and opaque to mitigate light migration at a gap between the primary and sample tray bodies constituting the outer housing.

8. A measurement system for ascertaining optical characteristics of a sample item, the system comprising:
   an integrating cavity device with a cavity defined by a light scattering monolithic comprised of one of fumed silica, barium sulfate and magnesium fluoride, the monolith having a substantially transparent liner of fused quartz thereover to further define the cavity and accommodate the sample item;
   a light source to supply light to the cavity for the light scattering; and
   a spectral detector to acquire scattered light readings from the cavity for sample item analysis.

9. The measurement system of claim 8 wherein the light source is a laser assembly accommodating a diode laser.

10. The measurement system of claim 8 wherein the supply of light to the cavity and the acquired light from the cavity are routed over fiber optics.

11. The measurement system of claim 10 further comprising a light pipe to the cavity to serve as an optical conduit.

12. The measurement system of claim 11 wherein the light pipe is a rod that is one of round, square, rectangular, tapered and hexagonal.

13. The measurement system of claim 11 wherein the light pipe is one of collimating and homogenizing.

14. The measurement system of claim 11 wherein the light pipe is of fused quartz.

15. A method of acquiring optical characteristics of a sample item, the method comprising:
   projecting a light toward an integrating cavity device from an external source;
   routing the light into a cavity of the device defined by a fumed silica monolith;
   utilizing the fumed silica monolith to diffusely scatter the light across a transparent liner positioned over the monolith and accommodating the sample item;
   acquiring the scattered light from the cavity; and
   analyzing the acquired light to ascertain the optical characteristics of the sample item.

16. The method of claim 15 wherein the analyzing further comprises one of optical photometry, metrology and spectroscopy.

17. The method of claim 15 further comprising:
   completing the acquiring of the scattered light;
   removing the sample item from the cavity at the transparent liner;
   cleaning the liner;
   positioning another sample item within the cavity at the transparent liner; and
   repeating each of the routing of the light, the utilizing of the fumed silica to diffusely scatter the light, the acquiring the scattered light and the analyzing of the acquired light to ascertain the optical characteristics of the other sample item.

18. The method of claim 15 further comprising fabricating the fumed silica monolith in a manner comprising:
   packing a structure of fumed silica particles ranging from about 20 nm to about 50 nm in particle size into a monolith;
   baking the monolith under pressure at between about 800 and about 1,000° C.; and
   forming a cavity defining morphology into the monolith.

19. The method of claim 15 further comprising employing the liner to impart a vacuum on the underlying fumed silica monolith.

20. The method of claim 19 further comprising subjecting the integrating cavity device to a vibration condition during one of transport and use in an industrial environment.

* * * * *